United States Patent Office 3,223,514
Patented Dec. 14, 1965

3,223,514
PROCESS FOR THE CONTROL OF
PLANT GROWTH
Marcel A. Gradsten, Demarest, N.J., assignor, by mesne assignments, to Tenneco Chemicals, Inc., a corporation of Delaware
No Drawing. Filed May 10, 1961, Ser. No. 108,995
4 Claims. (Cl. 71—2.3)

This invention relates to novel compounds that have herbicidal activity. It further relates to herbicidal compositions that contain these compounds and to methods of inhibiting or preventing plant growth.

It has been discovered that certain chlorobenzylphosphonic acids are effective herbicides. They are particularly useful as pre-emergence herbicides. Salts, esters, and amides derived from these acids exhibit equivalent selective herbicidal activity. The herbicidal compounds of the present invention may be represented by the formula

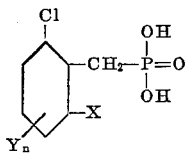

In this formula X represents a chlorine atom, a bromine atom, alkyl group containing 1 to 4 carbon atoms, or an alkoxy group containing 1 to 4 carbon atoms. Y represents a chlorine atom, a bromine atom, an alkyl group containing 1 to 4 carbon atoms, an alkoxy group containing 1 to 4 carbon atoms, an amino group, a nitro group, or a mixture of these substituents, and $n$ represents a number in the range of 0 to 3. The preferred compounds are those in which X and/or Y represents a chlorine substituent. Illustrative of the novel compounds are the following:

2,6-dichlorobenzylphosphonic acid
2,3,6-trichlorobenzylphosphonic acid
2-chloro-3,6-dimethylbenzylphosphonic acid
2,3-dichloro-6-ethylbenzylphosphonic acid
2,6-dichloro-3-methylbenzylphosphonic acid
2,3,6-trichloro-5-nitrobenzylphosphonic acid
2,3,6-trichloro-5-aminobenzylphosphonic acid
2-methoxy-3,6-dichlorobenzylphosphonic acid
2-methoxy-3,5,6-trichlorobenzylphosphonic acid
2,6-dichloro-3-methoxybenzylphosphonic acid
2,3,5,6-tetrachlorobenzylphosphonic acid
Dimethyltrichlorobenzylphosphonic acids
2-chloro-3-methyl-6-bromobenzylphosphonic acid
2,6-dichloro-3-butoxybenzylphosphonic acid, and
Pentachlorobenzylphosphonic acid.

A single chlorobenzylphosphonic acid or a mixture of two or more of these compounds may be used in the novel herbicidal compositions.

The chlorobenzylphosphonic acids may be prepared by any convenient procedure. One method that has proven satisfactory involves the reaction of the appropriate chlorotoluene with phosphorus trichloride and oxygen to form a phosphonyl chloride which is then converted to the corresponding acid by means of a hydrolysis step. This process is illustrated by the following equations:

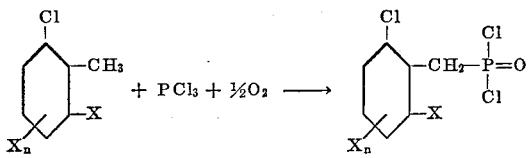 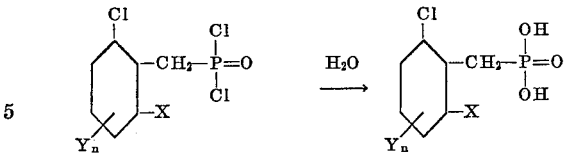

In these Equations X, Y and $n$ have the aforementioned significance.

The reaction of the chlorotoluene with phosphorus trichloride and oxygen to form the chlorobenzylphosphonyl chloride is preferably carried out by forming a mixture of the chlorotoluene with a stoichiometric excess of phosphorus trichloride and introducing a stream of oxygen below the surface of the mixture. To obtain the maximum yield of the product, approximately 2 to 10 moles and preferably 3 to 6 moles of phosphorus trichloride is used per mole of the chlorotoluene. The reaction may be carried out in the gaseous or liquid phase at temperatures between approximately 10° C. C. and 60° C. The reaction is exothermic, and the temperature is maintained in the desired range by adjustment of the rate at which oxygen is added and by external cooling.

While the reaction is ordinarily carried out in the absence of a solvent, a solvent, for example, carbon tetrachloride or benzene, may be present in the reaction mixture. The chlorobenzylphosphonyl chloride may be readily separated from unreacted chlorotoluene and phosphorus trichloride and from the phosphorus oxychloride that is formed as a by-product of the reaction by fractional distillation under atmospheric pressure or sub-atmospheric pressure.

The chlorobenzylphosphonyl chlorides may be treated with water to produce the corresponding chlorobenzylphosphonic acids by hydrolysis. The acids may be separated from the reaction mixture by extraction with diethyl ether or another water-immiscible solvent.

The herbicidal compounds of the present invention may be applied as the acids or as derivatives of the acids, such as salts, esters, or amides. Representative salts of these acids include the alkali metal and alkaline earth metals salts, for example, the sodium, potassium, calcium, and barium salts; the ammonium salt; and the salts of primary and secondary amines, for example, the mono and dialkyl amines in which the alkyl group contains from 1 to 4 carbon atoms. These compounds may also be used in the form of esters of the acids and alkanols containing from 1 to 4 carbon atoms, such as methanol, ethanol, isopropanol, n-propanol and butanol. Illustrative of the amides that may be used are the following: N-n-butylchlorobenzylphosphonamides, N-isopropylchlorobenzylphosphonamides, N,N-dimethylchlorobenzylphosphonamides, N,N-bis(2-hydroxyethyl)-chlorobenzylphosphonamides, chlorobenzylphosphonamide, and the like. These derivatives of the chlorobenzylphosphonic acids may be prepared by methods that are well known to those skilled in the art. For example, the dimethylamine salts may be prepared by dissolving the acids in water and adding to the resulting solution an amount of an aqueous dimethylamine solution that will bring its pH to approximately 7. The salt may, then, if desired, be recovered from the aqueous solution.

While the herbicidal compounds of the present invention may be applied to the soil as such, they are preferably used in combination with an inert carrier. The products may be mixed with or deposited upon an inert finely divided solid carrier and employed as dusts. Such mixtures may also be dispersed in water with or without the aid of a wetting agent and the resulting aqueous suspensions employed as sprays. Alternatively, these products may be used as the active herbicidal constituents in acetone, ether, alcohol, or hydrocarbon solutions, in oil-in-water emulsions, or in aqueous dispersions. The concentration of the herbicidal compound in the composition may vary within wide limits and depends upon a number of factors, the most important of which are the amount of the composition to be applied per unit of area and the type or types of plants being treated. Mixtures of two or more of the chlorobenzylphosphonic acids may be used. The herbicidal compositions may contain other herbicidal compounds in addition to the products of the present invention.

The herbicidal compositions may be applied to the soil or other medium which normally supports plant growth to control or inhibit the growth of weeds therein, or they may be used to keep an area free from all plant growth.

The invention may be illustrated by the examples that follow. It is to be understood, however, that the examples are given for the purpose of illustration and that the invention is not limited as to any of the specific materials or conditions cited therein except as set forth in the claims.

*Example 1*

Into a flask equipped with an agitator, reflux condenser, thermometer, and gas-inlet tube were placed 39.1 grams (0.2 mole) of 2,3,6-trichlorotoluene and 137.4 grams (1.0 mole) of phosphorus trichloride. This solution was stirred vigorously while a stream of oxygen was introduced below the liquid surface. After 15 minutes the temperature of the reaction mixture began to rise. It reached 60° C. within 30 minutes and was held at that temperature for approximately 4.5 hours by adjusting the rate at which oxygen was introduced and by external cooling. A total of 160 grams (5 moles) of oxygen was used during the reaction. The reaction mixture was then heated at 90° C. at 20 mm. pressure to distill off unreacted phosphorus trichloride and by-product phosphorus oxychloride. The semi-solid residue was suspended in 150 ml. of water, and five 20 ml. portions of a saturated sodium carbonate solution were added to bring the reaction mixture to a pH of 8–9. The reaction mixture was extracted with three 70 ml. portions of diethyl ether to remove the unreacted trichlorotoluene. The aqueous solution was acidified with dilute hydrochloric acid. The resulting suspension was extracted with three 70 ml. portions of diethyl ether. The ether extracts were dried over anhydrous sodium sulphate and then evaporated to dryness. There was obtained 5.5 grams of 2,3,6-trichlorobenzylphosphonic acid, a white solid that melted at 158°–159.2° C. This product contained 10.60% P (calculated for $C_7H_6Cl_3O_3P$, 11.22%) and 35.9% Cl (calculated, 38.6%).

The other chlorobenzylphosphonic acids of the present invention may be prepared by the procedure of Example 1 by using an equivalent amount of the appropriate chlorotoluene in place of the 2,3,6-trichlorotoluene.

*Example 2*

Groups of greenhouse flats containing soil were planted with bean, cotton, wheat, corn, mustard, and pigweed seeds, respectively. The soil in the flats was treated with a 0.3% aqueous suspension of 2,3,6-trichlorobenzylphosphonic acid immediately after planting. The amount of the suspension used was such as to apply the herbicidal compound at a rate equivalent to 4 pounds per acre. The results were observed seven days after the application of the herbicidal composition.

In the table that follows, the effectiveness of the herbicidal compound, as determined by comparison with untreated plantings, is indicated by the numbers "0" through "10" in increasing order of effectiveness. Thus "0" indicates no herbicidal activity; "1–3," slight injury; "4–6," moderate injury; "7–9," severe injury; and "10," destruction of all plants.

EFFECTIVENESS OF 2,3,6–TRICHLOROBENZYLPHOSPHONIC ACID AS A PRE-EMERGENCE HERBICIDE.

| Herbicide | Plant Species | | | | | |
|---|---|---|---|---|---|---|
| | Wheat | Corn | Bean | Cotton | Mustard | Pigweed |
| Product of Example 1 | 0 | 1 | 5 | 3 | 10 | 10 |

From the data in the foregoing table, it is clear that 2,3,6-trichlorobenzylphosphonic acid is effective as a selective herbicide. This compound was found to have far greater phytotoxic effect on the weed species tested (mustard and pigweed) than on the crop species.

Similar results may be obtained by using each of the other chlorobenzylphosphonic acids of the present invention in place of 2,3,6-trichlorobenzylphosphonic acid as the active component of the herbicidal composition.

I claim:

1. The process for the control of plant growth in a medium normally supporting plant growth which comprises applying to said medium a phytotoxic amount of a herbicidal compound selected from the group consisting of chlorobenzylphosphonic acids having the structural formula

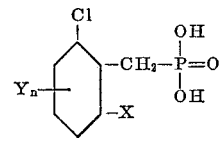

wherein X represents a member selected from the group consisting of chlorine, bromine, alkyl groups containing from 1 to 4 carbon atoms, and alkoxy groups containing from 1 to 4 carbon atoms; Y represents a member selected from the group consisting of chlorine, bromine, alkyl groups containing from 1 to 4 carbon atoms, alkoxy groups containing from 1 to 4 carbon atoms, amino, nitro, and mixtures thereof; and $n$ represents a number in the range of zero to 3; the sodium, potassium, calcium, barium, ammonium, and dimethylamine salts of said acids; and their methyl, ethyl, isopropyl, propyl, and butyl esters.

2. The process of claim 1 wherein the herbicidal compound is 2,3,6-trichlorobenzylphosphonic acid.

3. The process of claim 1 wherein the herbicidal compound is the sodium salt of 2,3,6-trichlorobenzylphosphonic acid.

4. The process of claim 1 wherein the herbicidal compound is the dimethylamine salt of 2,3,6-trichlorobenzylphosphonic acid.

References Cited by the Examiner

UNITED STATES PATENTS

| | | | |
|---|---|---|---|
| 2,573,769 | 11/1951 | Cambrech | 71—2.6 |
| 2,795,609 | 6/1957 | Jensen et al. | 260—543 |
| 2,847,458 | 8/1958 | Chao et al. | 260—500 |
| 2,861,876 | 11/1958 | Birum | 71—2.6 |
| 2,894,024 | 7/1959 | Whitehouse et al. | 260—500 |
| 2,927,014 | 3/1960 | Goyette | 71—2.3 |

OTHER REFERENCES

Denham et al., J. Organic Chemistry, vol. 23, pages 1298 to 1301, Sept. 1958.

LEWIS GOTTS, *Primary Examiner.*

LEON ZITVER, *Examiner.*